Dec. 24, 1968 J. O. HILDEBRAND ET AL 3,417,686

VARIABLE VOLUME HIGH PRESSURE AMMONIA DEVELOPMENT DEVICE

Filed Dec. 3, 1965 2 Sheets-Sheet 1

*INVENTORS*
JACK O. HILDEBRAND
RICHARD B. MULVANY
PERRIN F. SMITH

By John L. Jackson
ATTORNEY

United States Patent Office 3,417,686

Patented Dec. 24, 1968

3,417,686

VARIABLE VOLUME HIGH PRESSURE AMMONIA DEVELOPMENT DEVICE

Jack O. Hildebrand and Richard B. Mulvany, San Jose, and Perrin F. Smith, Saratoga, Calif., assignors to International Business Machines Corporation, Armonk, N.Y., a corporation of New York Filed Dec. 3, 1965, Ser. No. 511,406
10 Claims. (Cl. 95—89)

ABSTRACT OF THE DISCLOSURE

A variable volume ammonia developer including means for sealing a development chamber to a film to be developed. A rigid plate is held from contact with the film to be developed by clearance heels upon sealing such that excess air is removed from the face of the film to provide a minimum amount of air in the development chamber during development. The rigid plate is affixed to a resilient pad which in turn is affixed to the top wall of the development chamber. Application of ammonia into the development chamber after sealing causes the rigid plate to depress the resilient pad and the plate to rise from the face of the film to be developed to thereby provide a development chamber which is large in volume as compared to the development chamber, in which air is contained, prior to application of ammonia to the development device.

This invention relates to the high pressure ammonia development of ammonia sensitive materials in general and more particularly to a device suitable for use in the high pressure ammonia development technique in which entrapment of air is substantially eliminated at the instant of sealing and the volume of the development chamber at the time of sealing is made extremely small as compared to its volume during development.

In U.S. patent application Ser. No. 369,861 entitled, "Diazo Development Process," assigned to the assignee of the present application, there is provided a development process which enables the development of ammonia sensitive films or papers such as diazo in a fraction of a second. This process, simply stated, involves applying the developing ammonia to the surface to be developed at a relatively high pressure, such as for instance, 90 p.s.i.g. Obviously to utilize this process, tight developer platen to film sealing is necessary. As pointed out in the U.S. Patent 3,364,833 "Wash Ammonia Development Device," assigned to the assignee of the present application, experience with the high pressure ammonia development process has sometimes demonstrated non-uniform image development, when the necessary tight developer platen to film sealing is achieved. This non-uniformity often includes film areas that are completely undeveloped while adjacent film areas are fully developed. This non-uniformity of development is due to the entrapment of air between the film surface and the developer platen at the time the film is sealed to the developer platen.

Several solutions to this problem of entrapped air have been provided. One such solution is to mix the incoming ammonia with the entrapped air. This mixing approach is quite satisfactory in certain applications. However, it has been found to be quite difficult to provide complete mixing within a time compatible with high throughput rates where the film area to be developed is rectangular. Additionally, in the mixing approach, relatively large amounts of ammonia must be utilized to provide the necessary concentration and also to assure good mixing, the development chamber must be made relatively deep.

Another approach which has been proven to be highly satisfactory is described in the aforementioned U.S. patent, "Wash Ammonia Development Process." In the wash ammonia development process, mixing of the incoming ammonia and entrapped air is held to a minimum. The incoming ammonia is introduced, in the preferred embodiment, across one end of the rectangular film area to be developed and an exit port connected to an air escapement chamber is located at the other end of the development cavity. The incoming ammonia moves in a line across the face of the film and washes or sweeps the entrapped air ahead of it into the air entrapment chamber thus presenting a highly concentrated ammonia environment to the film surface. While the wash ammonia development process has been highly satisfactory in that a highly concentrated ammonia environment is presented to the surface of the film to be developed, since some mixing of the incoming ammonia and entrapped air does occur and since some of the pure ammonia is allowed to flow into the air entrapment chamber to assure that the surface of the film to be developed is completely covered by the ammonia, more ammonia than is actually required to develop a film area is used.

This excess usage of ammonia results not only in increased expense from the standpoint of ammonia usage but, additionally, the unused ammonia must after use be either vented or passed into an absorber unit or otherwise handled so as to prevent it from being introduced into the room atmosphere.

It is therefore an object of the present invention to provide a novel high pressure ammonia development device.

Another object of the present invention is to provide a new high pressure ammonia development device having a variable volume development chamber.

Another object of the present invention is to provide a new high pressure ammonia development device in which the volume of the development chamber at the time of its sealing to a film to be developed is relatively small as compared to its volume during development.

Another object of the present invention is to provide a new ammonia development device wherein the volume of entrapped air in the development chamber at the time of its sealing to a film is relatively small as compared to the volume of ammonia in the development chamber during development.

Another object of the present invention is to provide a new ammonia development device in which entrapped air is substantially eliminated from the development chamber at the time of sealing of the development chamber to a film area to be developed.

Another object of the present invention is to provide a new variable volume high pressure ammonia developer device in which the pressure of the incoming ammonia is utilized to expand the volume of the development chamber.

Another object of the present invention is to provide a new high pressure ammonia development device which is ideally suited for use in the wash ammonia development process which, upon sealing results in a minimum amount of air being trapped in the development chamber which must be washed from the face of the film into the air entrapment cavity.

Other and further objects and advantages of the invention will be apparent from the following more particular description of the preferred embodiment of the invention as illustrated in the accompanying drawings in which.

Figure 1A:
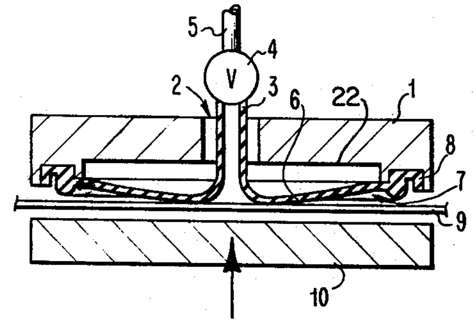
FIG. 1A is a cutaway end view of one embodiment of the novel variable volume ammonia developer having a flexible elastomer forming the wall of the development chamber.

Briefly, the subject novel variable volume ammonia developer includes means for sealing a development chamber to a film to be developed. In the preferred embodiment of FIGS. 4A and 4B, a rigid plate is held from contact with the film to be developed by clearance heels upon sealing such that excess air is removed from the face of the film to provide a minimum amount of air in the development chamber during development. The rigid plate is affixed to a resilient pad which in turn is affixed to the top wall of the development chamber. Application of ammonia into the development chamber after sealing causes the rigid plate to depress the resilient pad and the plate to rise from the face of the film to be developed to thereby provide a development chamber which is large in volume as compared to the development chamber, in which air is contained, prior to application of ammonia to the development device.

In the following discussion, the development chamber will be assumed to be of necessary configuration for developing the rectangular film area of a conventional aperture card. Thus, the development area itself will be rectangular and the seal around the film area likewise will be rectangular. A more detailed description of the development chamber and seals will be found in the aforementioned Patent 3,364,833. In the following views, the devices are cut away for purposes of simplicity of explanation. For a more detailed description, refer first to FIG. 1 wherein is shown one embodiment of a variable volume high pressure ammonia development device. In FIG. 1, a development platen 1 has an opening generally designated at 2 through which a flexible hose 3 passes and is in turn connected to an ammonia injection valve 4 which is connected by a line 5 to an ammonia source (not shown). The flexible hose 3 is an integral part of a development chamber wall 6 which is sealed around the rectangular development chamber generally designated at 7. An elastomer deformable seal 8 is contained in the development platen 1 and is operable to be brought into sealing contact with a film 9 to be developed. A movable backup platen 10 is operable to move the film 9 into sealing contact with the seal 8.

Figure 1B:
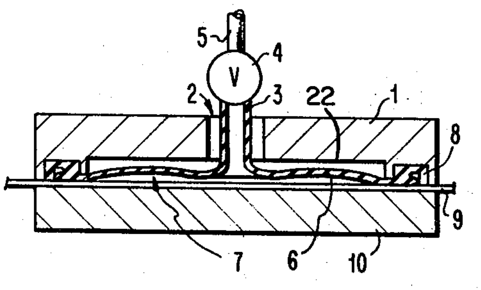
FIG. 1B is a view of the apparatus of FIG. 1A showing the developer platen closed and the development cavity formed by incoming ammonia.

In FIG. 1B, the backup platen 10 has been moved such that the film 9 has been forced by it into sealing contact with the deformable seal 8. Additionally, the ammonia injection valve 4 has been operated such that ammonia has passed down through the flexible tube 3 into the development chamber and the pressure of the ammonia has caused the flexible development chamber wall 6 to rise from the face of the film 9 to provide a development chamber such that ammonia can contact the face of the film.

In FIG. 1, the top wall 22 of the development chamber is covered by the member 6 such that the member 6 is the effective top wall of the chamber rather than the top wall 22. The same, as will be apparent from the following description, is true of FIGS. 2 and 3 wherein the top walls 24 and 23 are covered by effective top walls 11 and 20, respectively.

From a consideration of the configuration of the development wall of FIG. 1A, it can be seen that as the film 9 is brought in contact with the development wall that the film contacts the development wall 6 at the center intially and that if the backup platen 10 is closed, the air is rolled from the center outward. Thus, in the configuration of FIG. 1A, substantially all air in the development chamber 7 has been removed prior to introduction of ammonia. Additionally, upon introduction of ammonia, the development chamber is expanded to a volume which is substantially greater than the volume of the development chamber at the time of sealing.

Figure 2A:
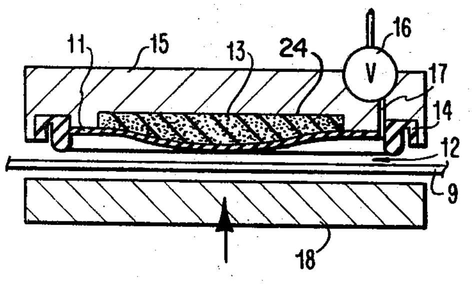
FIG. 2A is a cutaway end view of another embodiment of a variable volume development cavity wherein the flexible cavity wall is backed by a resilient material.

In all of the embodiments shown, the rectangular seal to a certain extent is part of the development chamber wall and, thus, in describing the members defining the development chamber, the term "sealing sides" will be used. Refer next to FIG. 2A wherein is shown another embodiment of a variable volume high pressure ammonia development device. The device of FIG. 2A is similar to that of FIG. 1A in that the development chamber wall 11 which is sealed around the development chamber 12 is designed to contact the center of the film to be developed initially upon sealing and to roll the air outward from the face of the film as the backup platen 18 closes. In FIG. 2A, the flexible chamber wall 11 is backed by a resilient material 13 to provide, as shown in FIG. 2A, the requisite rigidity such that the center of the film is initially contacted. Again, as in FIG. 1, a deformable seal 14 is mounted in the development platen 15 and operable to be brought into sealing contact with the film 9 to be developed. An ammonia injection valve 16 is mounted in the development platen 15 and is connected through an orifice 17 to one side of the development chamber 12.

Figure 2B:
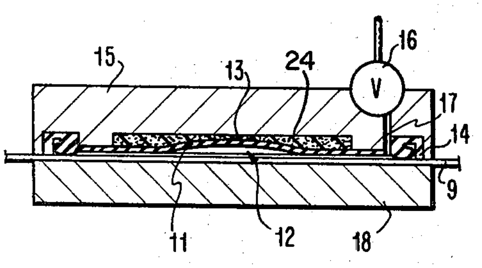
FIG. 2B is a view of the apparatus of FIG. 2A with the developer platen in sealing contact against the film to be developed and ammonia introduced into the development cavity.

In FIG. 2B, the device of FIG. 2A is shown sealed to the film. The backup platen 18 has thus been moved such that the film 9 is forced into sealing contact with the seal 14 and the ammonia injection valve 16 has been operated such that ammonia is introduced into the development chamber 12 and the pressure of the ammonia has caused the development chamber wall 11 to compress the resilient material 13 to provide a development chamber of required volume.

Figure 3A:
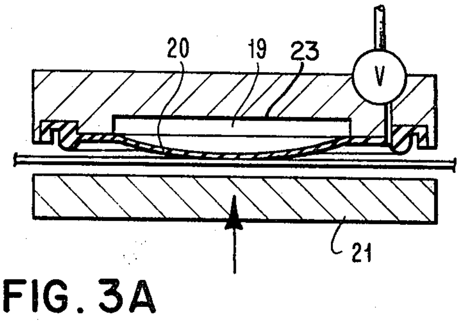
FIG. 3A is a cutaway end view of another embodiment of a variable volume ammonia development cavity wherein the development cavity wall is formed by a pressurized diaphragm.

In FIG. 3A is shown a device which is similar to that of FIG. 2B in all respects other than that the resilient material 13 of FIG. 2A has been replaced by a pressurized chamber 19 which contains air under pressure. The air under pressure causes the development chamber wall 20 to be in a configuration as shown in FIG. 3A such that the center of the film to be developed contacts the development chamber wall initially and with further closing of the backup platen 21, the air is rolled from the center outwards to provide a minimum amount of air entrapment.

Figure 3B:
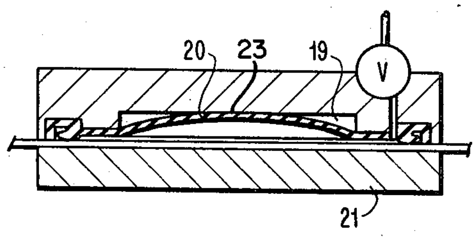
FIG. 3B is a view of the apparatus of FIG. 3A wherein the developer platen is sealed to the film to be developed and ammonia is introduced into the development chamber.

FIG. 3B is a view of the apparatus of FIG. 3A with the development platen completely closed to provide sealing and ammonia in the development chamber to depress the diaphragm-like member 20 to provide a development chamber of required volume.

Figure 4A:
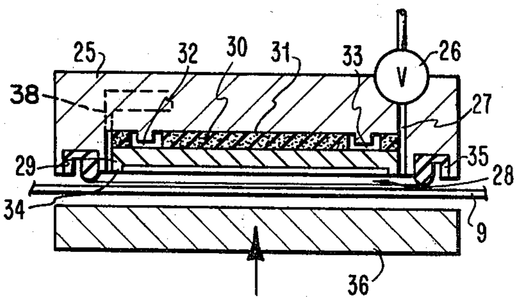
FIG. 4A is another embodiment of a variable volume ammonia developer wherein the development chamber wall is rigid and is bonded to a depressible resilient pad and further wherein the extent of expansion of the development chamber is controlled by means of stops acting upon the rigid development chamber wall.
Figure 4B:
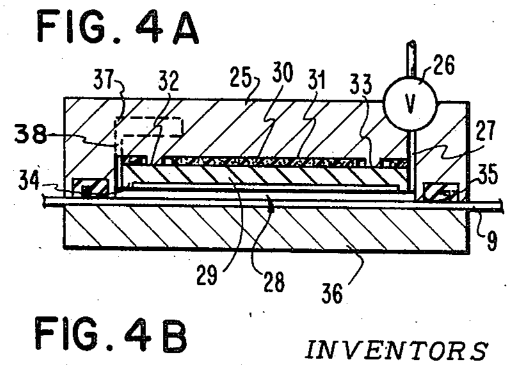
FIG. 4B is a view of the apparatus of FIG. 4A wherein the developer platen is sealed against the film to be developed and ammonia is introduced into the development chamber.

In FIG. 4A is shown an alternate embodiment of a variable volume high pressure ammonia development device for use in those applications where the face of the film to be developed should not be contacted by any member during the development process. This type of development would be required where the emulsion is quite soft or where other considerations dictate that the face of the film is not to be contacted. In FIG. 4A, a development platen 25 is provided in which is mounted an ammonia injection valve 26 connected through an orifice 27 into the development chamber designated generally at 28. A fixed rigid development chamber wall 29 is fixed to a resilient pad 30 which in turn is fixed to the top of the chamber wall 31. Stops 32 and 33 are provided in operable association with the rigid plate 29. The rigid plate 29 includes a clearance heel 34 at each corner. The clearance heels contact the film 9 to be developed outside of the image area and provide a thin cavity over the film area to be developed thus protecting the film from contact with the development chamber wall and at the same time providing a passage for the initial introduction of ammonia. As in the previous embodiments, a rectangular depressible seal 35 is provided. When the backup platen 36 is closed thereby causing the film 9 to be brought into sealing contact with the seal 35, the heels 34 of the rigid plate 29 contact the face of the film 9. In FIG. 4B is shown the device of FIG. 4A wherein ammonia has been introduced into the ammonia injection valve 26 down through the orifice 27. The pressure of the ammonia causes the rectangular cavity wall 29 to compress the resilient pad 30 and form a development cavity 28 of required volume. The stops 32 and 33 limit the extent of travel of the rigid plate 29 such that a controlled volume is provided. Shown in dotted lines is an air entrapment exit port 36 and an air entrapment cavity 37. As is more fully discussed in the aforementioned Patent 3,364,833, "Wash Ammonia Development Device," an excellent way of providing highly concentrated ammonia to the face of the film to be developed is to introduce the ammonia in such a manner that the flow across the face of the film washes any entrapped air ahead of it into an air entrapment cavity removed from the face of the film. The air entrapment exit 38 and air entrapment cavity 37 are included in the apparatus of FIGS. 4A and 4B to illustrate how this device might be modified for using a wash type development. Similarly, air entrapment exit ports and air entrapment cavity ports can be provided in the previously described or to be described ammonia development devices.

Figures 5A, 5B, 5C, 6A, 6B, 7A, 7B:
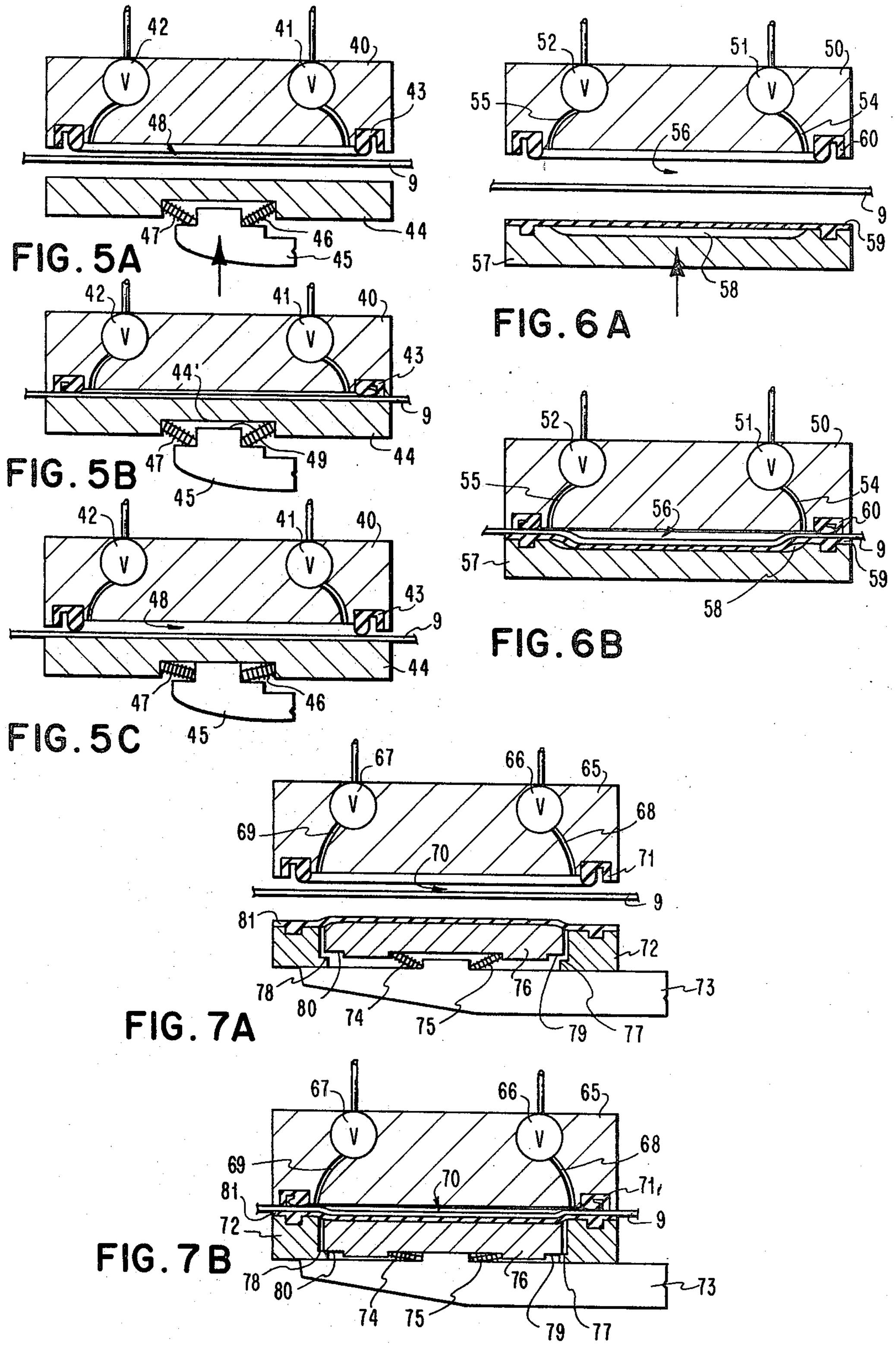
FIG. 5A is a cutaway end view of another embodiment of a variable volume developer wherein introduction of ammonia into the development chamber after sealing causes the backup platen to move from the developer platen to provide a development chamber of controlled volume.
FIG. 5B is a view of the apparatus of FIG. 5A at the time of sealing of the developer platen to the film to be developed.
FIG. 5C is a view of the apparatus of FIG. 5B after ammonia has been introduced into the development chamber.
FIG. 6A is a cutaway end view of another embodiment of a variable volume ammonia developer wherein the variable volume means is provided in the backup platen beneath the film to be developed and the film, upon introduction of ammonia under pressure, is caused to physically deform down into the backup platen to provide a development chamber.
FIG. 6B is a view of the apparatus of FIG. 6A wherein the developer platen is sealed to the film to be developed and ammonia is introduced into the development chamber.
FIG. 7A is another embodiment of a variable volume ammonia developer device wherein a portion of the backup platen is springloaded against the film upon sealing of the developer platen to the film and introduction of ammonia into the developer platen causes the film to be physically deformed down into the backup platen to provide a development chamber.
FIG. 7B is a view of the apparatus of FIG. 7A after the developer platen has been sealed to the film to be developed and ammonia is introduced into the development chamber.

In FIG. 5A is shown a development platen 40 having an ammonia injection valve 41 and an air relief valve 42. The air relief valve 42 is provided for utilization during sealing of the development platen to the film. As is obvious, upon closing of any of the embodiments discussed above, the seal 43 deforms after initial sealing permitting the platen motion to continue and, therefore, cause pressure to build up in the development chamber. The relief valve 42 is open during sealing such that the air can escape from the development chamber. This air escapement valve 42 is not necessary; however, in some applications, it may be undesirable to build up internal pressure above ambient upon sealing and prior to injection of the ammonia and the air relief valve may be utilized with any of developer embodiments herein described. In FIG. 5A, the development platen 40 is provided with the rectangular seal 43. The film 9 to be developed is, in the preferred embodiment, caused to move into sealing engagement with the seal 43 by action of a backup platen 44. The backup platen 44 is moved by means of an arm 45. The motion from the arm 45 is communicated to the backup platen 44 by means of springs 46 and 47 which are attached to the arm 45.

In FIG. 5B, the backup platen 44 has been moved through movement of arm 45 such that the film 9 is in sealing engagement with the seal 43. Application of ammonia to the development chamber designated generally at 48 causes the film to act upon the backup platen 44 to cause the face 44' to seat on the seat 49 which is an integral part of the arm 45. The movement of the backup platen 44 is thus controlled such that a development chamber 48 of desired volume is provided.

In FIG. 6 is shown an alternate embodiment of the variable volume high pressure ammonia development device wherein the film to be developed is caused, upon application of ammonia under pressure, to physically deform down into the backup platen such that a development chamber is formed between the face of the film and the development platen. In FIG. 6A, the development platen 50 is provided again with an ammonia injection valve 51 and an air escapement valve 52 connected by means of orifices 54 and 55, respectively, to the ammonia development cavity designated generally at 56. In the movable backup platen 57, there is formed a cavity 58 covered by a flexible member 59. As shown in FIG. 6B when the movable backup platen 57 forces the film 9 into sealing contact with the seal 60 and ammonia is entered into the development chamber 56, the film 9 is physically deformed by the pressure of the ammonia down into the chamber 58 to provide a development chamber 56 of predetermined volume.

In FIG. 7A is shown another embodiment of a variable volume high pressure ammonia development device wherein the film 9 to be developed is physically deformed down into the backup platen. Again, in FIG 7A, the development platen 65 contains an ammonia injection valve 66 and air escapement valve 67 connected by orifices 68 and 69, respectively, to the development cavity generally designated at 70. A deformable seal 71 is provided on the development platen. The backup platen 72 is moved by means of an arm 73 to cause the film 9 to be brought into sealing contact with the seal 71. The motion of the arm 73 is introduced by means of springs 74 and 75 to a rigid backup member 76 which can move vertically with the backup platen 72. The backup platen 72 has ledges 77 and 78 which are connected in the operable position of the backup platen by faces 79 and 80 of the rigid backup member 76. In operation, the arm 73 moves the backup platen 72 and acting through the springs 74 and 75 moves the rigid backup member 76 which is covered by a flexible member 81 to cause the film 9 to be moved into sealing engagement with the seal 71 on the development platen 65. When ammonia is introduced through the ammonia injection valve 66, the pressure in the development chamber 70 builds up and overcomes the action of springs 74 and 75 to cause the film 9 to act upon the flexible member 81 to move rigid backup member 76 and thereby seat faces 79 and 80 on protrusions 77 and 78, respectively. Thus, the vertical movement of the rigid backup member 76 is limited by the seat protrusion combination 78 and 80 and 77 and 79. In this manner, the deformation of the film 9 into the backup platen 72 is controlled to provide a development cavity of desired volume.

While in the preferred embodiment, there has been shown and described a high pressure ammonia development device for utilization in developing a rectangular film area such as that of an aperture card, it will be obvious to those skilled in the art that the configuration of the film area and, consequently, the configuration of the development device could be of any other shape, such as round, square, etc. Likewise, as previously mentioned, any one of the aforedescribed variable volume development devices could be utilized in the wash ammonia development mode of operation wherein an air escapement cavity is located away from the surface of the film to be developed but geometrically spaced from the ammonia injection port such that any entrapped air is washed from the face of the film surface.

Furthermore, while a number of embodiments have been shown and described which provide a number of different implementations of the novel concept of making the development chamber of a high pressure ammonia developer small in volume at the time of sealing as compared to its volume during development, many other ways of providing a variable volume developer exist and the provision of the various embodiments is not intended to be all inclusive but is done to facilitate an understanding of the subject novel concept.

Moreover, while in the preceding description and following claims, the members which limit the amount of entrapped air in the development chamber have been defined as being in contact with the film area to be developed, it will of course be understood by those skilled in the art that the members could be in virtual contact without departing from the subject inventive concept.

In summary, referring to FIG. 4, the subject novel variable volume ammonia developer includes means 35 for sealing a development chamber to a film to be developed. The development chamber wall 29 contacts or nearly contacts the face of the film 9 to be developed upon sealing such that excess air is removed from the face of the film at the time of sealing to provide a minimum amount of air in the development chamber during development. Application of ammonia into the development chamber after sealing causes the development chamber wall 29 to rise from the face of film to be developed to thereby provide a development chamber 28 which is large in volume as compared to the development chamber, in which air is contained, prior to application of ammonia to the development device.

What is claimed is:

1. In a device wherein a development chamber including a top wall and sealing sides is sealed around a film area to be contacted by a developing substance and prior to valving of the substance into the chamber entrapped air exists in the sealed chamber, means for introducing said developing substance into the chamber a device for limiting the amount of entrapped air in the chamber at the time of its sealing to the area to be contacted by said substance, said device comprising:

- a retractable means in said chamber in contact with said film area at the time of sealing;
- said retractable means being withdrawn from contact with said film area upon the valving of said substance to said chamber.

2. The device of claim 1 wherein said retractable means in said development chamber is forced from contact with said film area by the pressure of said substance.

3. The device of claim 2 wherein said retractable means comprises the effective top wall of said development chamber such that withdrawal of said retractable means increases the volume of said development chamber.

4. The device of claim 3 wherein said retractable member which constitutes the effective top wall of the development chamber is a flexible elastomer formed such that during sealing of the development chamber to the area to be developed, the center of the area to be developed is contacted initially by said flexible elastomer and the line of contact thereafter proceeds from the center outward.

5. The device of claim 3 wherein said retractable member which constitutes the effective top wall of the development chamber is a flexible elastomer backed by a resilient material disposed between it and said top wall such that during sealing of the development chamber to said area to be developed, the center of said area is contacted initially by said flexible elastomer and the line of contact thereafter proceeds from the center outward.

6. The device of claim 3 wherein said retractable member which constitutes the effective top wall of the development chamber is a flexible elastomer loaded by air pressure acting on it and said top wall such that during sealing of the development chamber to said area to be developed, the center of said area is contacted initially by said flexible elastomer and the line of contact thereafter proceeds from the center outward.

7. The device of claim 2 wherein the retractable member constitutes a rigid plate having clearance heels adjacent the outer extremities of the area to be developed and said rigid plate is separated from said top wall by a resilient member which is compressed by the pressure of said substance acting upon said rigid plate.

8. In a device wherein a development chamber including a top wall and resilient sides is sealed around an area to be contacted by a substance and prior to valving of the substance into the chamber entrapped air exists in the sealed chamber, a device for limiting the amount of entrapped air in the chamber at the time of its sealing to the area to be contacted by said substance, said device comprising:

- a backup platen supporting said area movable to bring said area into sealing contact with said resilient sealing sides; and
- means for biasing said area supported by said backup platen such that upon sealing said area is in contact with said top wall and upon the valving of said substance to said chamber the pressure of said substance in said chamber causes said area to move from contact with said top wall while remaining in sealing contact with said sealing sides.

9. The device of claim 8 wherein said means for biasing said area causes, upon the sealing of said area to said development chamber, the resilient sealing sides to be depressed while upon the valving of said substance to said chamber the pressure in said chamber acting between said area, said sealing sides and said top wall is sufficient to partially overcome said biasing means and said area and said backup platen are caused to move away from said chamber a distance less than the amount of depression of said resilient sealing walls.

10. The device of claim 8 wherein said means for biasing said area is mounted in said backup platen and the valving of said substance into said chamber causes said area to deform into said backup platen with no movement by said backup platen away from said top wall.

References Cited

UNITED STATES PATENTS

| | | | |
|---|---|---|---|
| 2,665,619 | 1/1954 | Tuttle et al. | 95—14 |
| 3,229,608 | 1/1966 | Staub et al. | 95—89 |

NORTON ANSHER, *Primary Examiner.*

CHARLES E. SMITH, *Assistant Examiner.*